United States Patent
Ding et al.

(10) Patent No.: US 11,677,480 B2
(45) Date of Patent: Jun. 13, 2023

(54) SYSTEMS, METHODS, AND APPARATUS FOR SYMBOL TIMING RECOVERY BASED ON MACHINE LEARNING

(71) Applicant: Samsung Electronics Co., Ltd., Suwon-si (KR)

(72) Inventors: Yacong Ding, San Diego, CA (US); Hyukjoon Kwon, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/359,499

(22) Filed: Jun. 25, 2021

(65) Prior Publication Data
US 2022/0329329 A1 Oct. 13, 2022

Related U.S. Application Data

(60) Provisional application No. 63/174,530, filed on Apr. 13, 2021.

(51) Int. Cl.
*H04B 17/17* (2015.01)
*G06N 3/08* (2023.01)
(Continued)

(52) U.S. Cl.
CPC .............. *H04B 17/17* (2015.01); *G06N 3/04* (2013.01); *G06N 3/08* (2013.01); *H04L 27/261* (2013.01); *H04L 27/2657* (2013.01)

(58) Field of Classification Search
CPC combination set(s) only.
See application file for complete search history.

(56) References Cited

U.S. PATENT DOCUMENTS

| 7,420,759 B2 * | 9/2008 | Che | G11B 20/10009 360/31 |
| 7,630,463 B2 * | 12/2009 | Shin | H04L 27/2662 375/326 |

(Continued)

FOREIGN PATENT DOCUMENTS

| CN | 1433166 A | * | 7/2003 | ......... H04L 27/2657 |
| CN | 1438776 A | * | 8/2003 | ......... H04L 27/2662 |

(Continued)

*Primary Examiner* — Berhanu Tadese
(74) *Attorney, Agent, or Firm* — Renaissance IP Law Group LLP

(57) ABSTRACT

A method may include generating an estimated time offset based on a reference signal in a communication system, and adjusting a transform window in the communication system based on the estimated time offset, wherein the estimated time offset is generated based on machine learning. Generating the estimated time offset may include applying the machine learning to one or more channel estimates. Generating the estimated time offset may include extracting one or more features from one or more channel estimates, and generating the estimated time offset based on the one or more features. Extracting the one or more features may include determining a correlation between a first channel and a second channel. The correlation may include a frequency domain correlation between the first channel and the second channel. Extracting the one or more features may include extracting a subset of a set of features of the one or more channel estimates.

19 Claims, 9 Drawing Sheets

(51) Int. Cl.
*H04L 27/26* (2006.01)
*G06N 3/04* (2023.01)

(56) References Cited

U.S. PATENT DOCUMENTS

| | | | | |
|---|---|---|---|---|
| 7,916,817 B2* | 3/2011 | Coulson | ............. | H04L 27/2691 |
| | | | | 375/150 |
| 8,582,634 B2* | 11/2013 | Li | .................. | H04L 27/2657 |
| | | | | 375/229 |
| 8,594,210 B2* | 11/2013 | Wilhelmsson | ........ | H04L 25/022 |
| | | | | 375/348 |
| 8,718,154 B2* | 5/2014 | Yoo | ................. | H04L 27/2665 |
| | | | | 375/260 |
| 9,537,678 B2* | 1/2017 | Lee | .................... | H04L 25/0242 |
| 10,270,642 B2* | 4/2019 | Zhang | .................... | H04B 1/38 |
| 10,374,863 B2* | 8/2019 | Xu | .......................... | H04L 25/00 |
| 10,397,039 B2* | 8/2019 | Zhang | .................... | H04B 17/364 |
| 10,495,725 B2* | 12/2019 | Zhang | .................... | G01S 13/003 |
| 10,735,298 B2* | 8/2020 | Chen | ................... | A61B 5/7253 |
| 10,742,475 B2* | 8/2020 | Lai | ........................ | H04W 72/21 |
| 10,797,805 B1* | 10/2020 | Mirfakhraei | ........... | H04B 17/10 |
| 10,866,302 B2* | 12/2020 | Wu | ......................... | H04W 4/33 |
| 10,937,443 B2* | 3/2021 | Hijazi | ................ | G10L 21/0208 |
| 2003/0004798 A1* | 1/2003 | McAuliffe | ......... | G06Q 30/0601 |
| | | | | 705/26.1 |
| 2004/0125003 A1* | 7/2004 | Craven | ............... | H03M 7/3046 |
| | | | | 341/76 |
| 2006/0083160 A1* | 4/2006 | Koo | ................... | H04L 27/0014 |
| | | | | 370/208 |
| 2006/0176802 A1* | 8/2006 | Ko | ..................... | H04L 27/2675 |
| | | | | 370/208 |
| 2006/0176980 A1* | 8/2006 | Lee | ........................ | H04L 7/042 |
| | | | | 375/321 |
| 2007/0030838 A1* | 2/2007 | Kaikkonen | ........... | H04W 52/44 |
| | | | | 370/342 |
| 2007/0072621 A1* | 3/2007 | Mukkavilli | ........... | G01S 5/0226 |
| | | | | 455/456.1 |
| 2008/0100943 A1* | 5/2008 | Che | ................. | G11B 20/10009 |
| | | | | 360/31 |
| 2020/0064444 A1* | 2/2020 | Regani | .................... | G01S 7/412 |
| 2020/0154482 A1* | 5/2020 | Ahn | .................... | H04W 74/006 |
| 2020/0271749 A1* | 8/2020 | Wu | ........................ | G01S 5/0278 |
| 2020/0367193 A1* | 11/2020 | Cha | ........................ | H04W 24/10 |
| 2021/0020202 A1* | 1/2021 | Zhang | ................. | H04N 9/8205 |
| 2021/0091866 A1* | 3/2021 | Zhang | ................. | H04B 17/309 |
| 2022/0329329 A1* | 10/2022 | Ding | ........................ | G06N 3/08 |

FOREIGN PATENT DOCUMENTS

| | | | | | |
|---|---|---|---|---|---|
| CN | 1236573 C | * | 1/2006 | ......... | H04L 27/2657 |
| CN | 1777166 A | * | 5/2006 | ......... | H04L 27/2657 |
| CN | 1777166 B | * | 12/2010 | ......... | H04L 27/2657 |
| CN | 1881970 B | | 1/2011 | | |
| CN | 109753863 A | * | 5/2019 | ....... | G06F 16/24568 |
| CN | 110018733 A | * | 7/2019 | ............. | G06F 3/013 |
| CN | 110086742 A | * | 8/2019 | ......... | H04L 27/2607 |
| CN | 111819892 A | * | 10/2020 | ............... | G01S 1/38 |
| CN | 110891036 B | | 12/2020 | | |
| CN | 112329914 A | * | 2/2021 | ............... | G01R 31/00 |
| CN | 115208729 A | * | 10/2022 | ............... | G06N 3/04 |
| DE | 102020123910 A1 | * | 3/2021 | ........... | G06K 7/1413 |
| EP | 1001275 A2 | * | 5/2000 | ........... | G01S 3/8034 |
| EP | 1330087 A2 | * | 7/2003 | ........ | H04L 27/2657 |
| EP | 1331783 A2 | * | 7/2003 | ........ | H04L 27/2662 |
| EP | 1478150 A2 | * | 11/2004 | ........ | H04L 27/2662 |
| EP | 1657874 A1 | * | 5/2006 | ........ | H04L 27/2657 |
| EP | 1330087 A3 | * | 11/2006 | ........ | H04L 27/2657 |
| EP | 1478150 A3 | * | 8/2007 | ........ | H04L 27/2662 |
| EP | 1949636 B1 | * | 7/2018 | ........ | H04L 27/2665 |
| FR | 3076412 A1 | * | 7/2019 | ............. | G06N 3/084 |
| JP | 2003258767 A | * | 9/2003 | ........ | H04L 27/2657 |
| JP | 2006014335 A | * | 1/2006 | ............. | H04B 1/709 |
| JP | 3768194 B2 | * | 4/2006 | ........ | H04L 27/2657 |
| JP | 2019087221 A | * | 6/2019 | ....... | G06F 16/24568 |
| JP | 6688821 B2 | * | 4/2020 | ....... | G06F 16/24568 |
| KR | 2003097040 A | * | 12/2003 | | |
| KR | 2005039335 A | * | 4/2005 | | |
| NZ | 524929 A | * | 11/2005 | ............... | H04B 1/76 |
| WO | WO-2004086662 A1 | * | 10/2004 | ............... | H04B 1/76 |
| WO | WO-2020068127 A1 | * | 4/2020 | ........... | G06K 9/6262 |

* cited by examiner

SYSTEMS, METHODS, AND APPARATUS FOR SYMBOL TIMING RECOVERY BASED ON MACHINE LEARNING

CROSS-REFERENCE TO RELATED APPLICATION

This application claims priority to, and the benefit of, U.S. Provisional Patent Application Ser. No. 63/174,530 titled "Systems, Methods, and Apparatus for Symbol Timing Recovery Based on Supervised Learning" filed Apr. 13, 2021 which is incorporated by reference.

TECHNICAL AREA

This disclosure relates generally to communication systems, and specifically to systems, methods, and apparatus for symbol timing recovery based on machine learning.

BACKGROUND

A communication system may use a transform such as a fast Fourier transform (FFT) to determine the frequency content of a signal. An FFT may be performed on samples of a signal in a timing window that may drift.

The above information disclosed in this Background section is only for enhancement of understanding of the background of the invention and therefore it may contain information that does not constitute prior art.

SUMMARY

A method may include generating an estimated time offset based on a reference signal in a communication system, and adjusting a transform window in the communication system based on the estimated time offset, wherein the estimated time offset is generated based on machine learning. Generating the estimated time offset may include applying the machine learning to one or more channel estimates. Generating the estimated time offset may include extracting one or more features from one or more channel estimates, and generating the estimated time offset based on the one or more features. Extracting the one or more features may include determining a correlation between a first channel and a second channel. The correlation may include a frequency domain correlation between the first channel and the second channel. Extracting the one or more features may include extracting a subset of a set of features of the one or more channel estimates. The set of features may include a set of frequency domain channel correlations. The set of frequency domain channel correlations may be calculated based on frequency domain channels separated by $\Delta$ subcarriers. The set of frequency domain channel correlations may be based on channel correlations corresponding to a series of $\Delta$, and the subset may include frequency domain channel correlations based on one or more highest $\Delta$ and one or more lowest $\Delta$. A neural network may generate the estimated time offset based on the one or more features. Generating the estimated time offset based on the one or more features may be performed, at least in part, by a neural network. The neural network may generate one or more classification outputs based on the one or more features. Generating the estimated time offset may include combining two or more classification outputs from the neural network. The reference signal may include a first reference signal, the estimated time offset may include a first estimated time offset, and the method may further include generating a second estimated time offset based on a second reference signal that may be generated less frequently than the first reference signal, and adjusting the transform window based on a combination of the first estimated time offset and the second estimated time offset.

A method may include estimating a time offset in a communication system based on a first reference signal, estimating a first arrival path based on a second reference signal that may be transmitted less frequently than the first reference signal, and adjusting a transform window based on the time offset and the first arrival path. Estimating a time offset based on the first reference signal may include generating one or more channel estimates based on the first reference signal, extracting one or more features from the one or more channel estimates, and generating, by a machine learning process, the time offset based on the one or more features. The one or more channel estimates may provide a set of frequency domain channel correlations between channels separated by $\Delta$ subcarriers, and extracting the one or more features may include extracting a subset of the set of frequency domain channel correlations. A number of candidate frequency domain channel correlations may be based on a reference signal configuration and a resource block bundling configuration. The machine learning process may be based on a neural network.

An apparatus may include a feature extractor configured to extract one or more features from one or more channel estimates based on a reference signal, trained logic configured to generate an estimated time offset based on the one or more features, and a window processor configured to adjust a transform window based on the estimated time offset. The feature extractor may include a channel correlator, and the trained logic may include a neural network.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figure 1A:
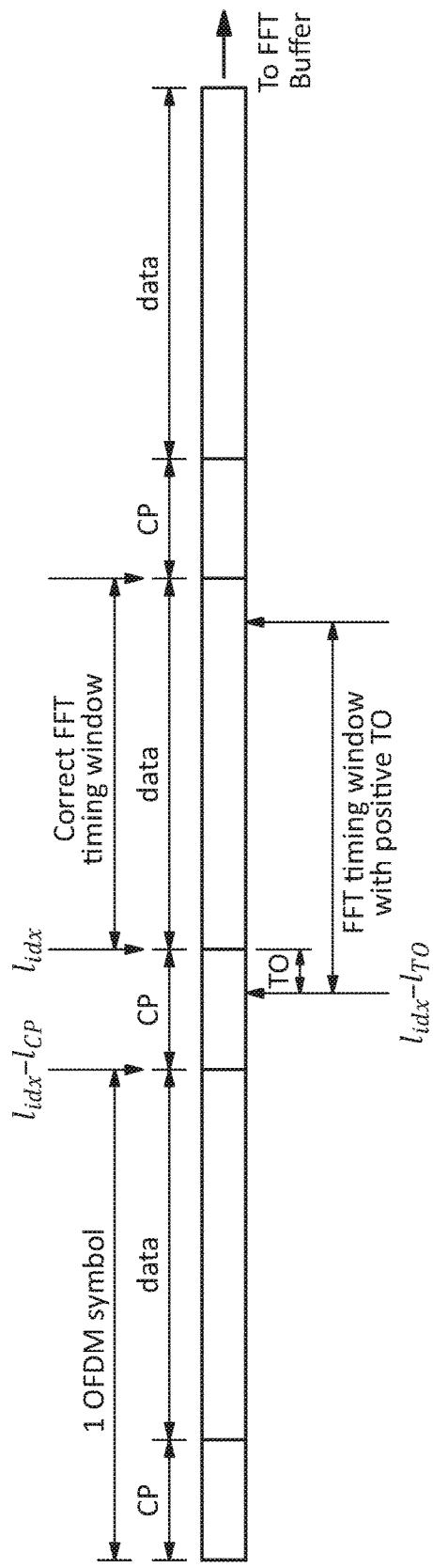
FIG. 1A is a timing diagram that illustrates a timing window for an FFT having a positive time offset in a communication system using orthogonal frequency-division multiplexing (OFDM) in accordance with example embodiments of the disclosure.

In some communication systems in accordance with example embodiments of the disclosure, a transform such as a fast Fourier transform (FFT) may be performed on a signal to determine the frequency content of a symbol that may be transmitted in the signal. The transform may be performed in a timing window that may align with the symbol. Timing drifts may cause the window to shift relative to the symbol, thereby resulting in errors in the transform. Thus, one or more symbol timing recovery (STR) techniques may be used to adjust the timing of the transform window to keep it synchronized with a symbol.

In some embodiments, an STR technique may be based on a periodic wideband reference signal (RS) such as a synchronization signal block (SSB) in a 5G wireless network. An SSB may be used to estimate a first arrival path (FAP), which may then be used to adjust the window timing. However, such reference signals may be transmitted relatively infrequently. Thus, it may be difficult to use one of these reference signals to adjust a timing window that may drift rapidly during the time between the infrequently transmitted reference signals.

In some embodiments, an STR technique may be based on a more frequently transmitted reference signal such as a demodulation reference signal (DMRS) for a physical downlink shared channel (PDSCH) in a 5G wireless network. For example, some embodiments may adjust a timing window based on the difference between two center of mass (COM) estimates for a frequency domain correlation between channels. However, some COM techniques may have accuracy, stability, and/or residual offset problems, as well as requiring a previous COM estimate to be stored to calculate differences.

In some STR schemes in accordance with example embodiments of the disclosure, a machine learning technique may be used to estimate a time offset to adjust a transform window. For example, in some embodiments, a neural network may be trained to generate an estimated time offset based on one or more features extracted from channel estimates. The channel estimates may include timing information based on a relatively frequent reference signal such as PDSCH DMRS. Although not limited to any particular features, in some embodiments, one or more frequency domain (FD) channel correlations may be used as input features to a neural network.

Depending on the implementation details, an STR scheme in accordance with example embodiments of the disclosure may provide a direct estimate of a time offset, and therefore, previous time estimates may not be used. Additionally, or alternatively, some embodiments include a residual time offset within an estimated time offset. Additionally, or alternatively, because some embodiments may estimate time offsets based on multiple FD channel correlations, they may provide estimates that may be more stable, accurate, and/or robust.

In some embodiments, a time estimate generated using machine learning based on a relatively frequent reference signal may be combined with a time estimate based on a relatively infrequent reference signal. Depending on the implementation details, this may exploit existing apparatus and/or processing, thereby reducing cost, complexity, energy consumption, processing time, and/or the like.

In some embodiments, the features used as inputs to a neural network may be selected as a subset of a greater number of candidate features. For example, in an embodiment that uses FD channel correlations as input features, there may be a total number of candidate FD channel correlations based, for example, on a reference signal configuration and/or resource block bundling size. By using only a subset of the candidate FD channel correlations, some embodiments may reduce the cost, complexity, processing time, storage space, integrated circuit (IC) area, power consumption, and/or the like of the neural network and/or associated apparatus.

Depending on the implementation details, some embodiments may operate on any type of channel regardless of system bandwidth, channel selectivity, and/or the like.

This disclosure encompasses numerous inventive principles relating to symbol timing recovery. These principles may have independent utility and may be embodied individually, and not every embodiment may utilize every principle. Moreover, the principles may also be embodied in various combinations, some of which may amplify the benefits of the individual principles in a synergistic manner.

Example Embodiments

Some example embodiments of systems, apparatus, devices, processes, methods, and/or the like illustrating some possible implementation details according to this disclosure are described herein. These examples are provided for purposes of illustrating the principles of this disclosure, but the principles are not limited to or defined by these embodiments, implementation details, and/or the like. For example, some embodiments may be described in the context of 5G and/or New Radio (NR) wireless communication systems, but the principles may also be applied to any other types of wired and/or wireless systems including 3G, 4G and/or future generations of wireless networks, and/or any other communication systems that may implement symbol timing recovery, frequency transform window adjustment, and/or the like.

Timing Offset

Figure 1B:
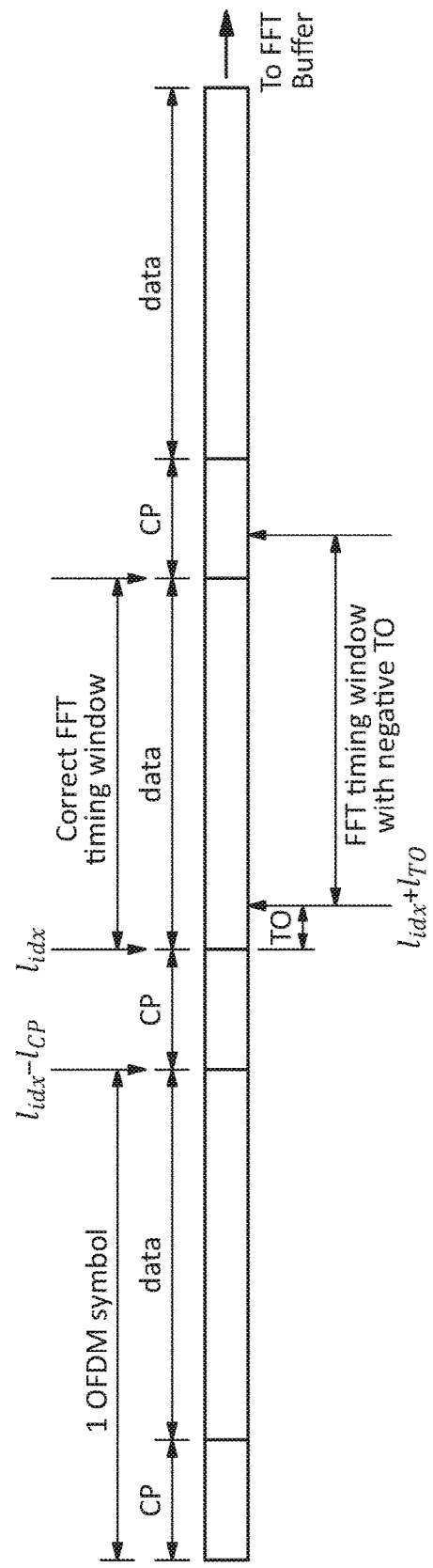
FIG. 1B is a timing diagram that illustrates a timing window for an FFT having a negative time offset in a communication system using OFDM in accordance with example embodiments of the disclosure.

FIG. 1A and FIG. 1B illustrate timing windows for an FFT having a positive time offset (TO) and a negative TO, respectively, in a communication system using orthogonal frequency-division multiplexing (OFDM) in accordance with example embodiments of the disclosure. Each OFDM symbol may include a data portion and a cyclic prefix (CP) portion. In some embodiments, a CP may be implemented as a copy of a final portion of the data.

The term $l_{idx}$ may represent the starting point of a correct FFT timing window for an OFDM symbol, and the term $l_{TO}$ may represent the absolute value of the TO which may be measured, for example, in terms of FFT samples. For a positive TO case as shown in FIG. 1A, the starting point of the FFT window may be given by $l_{idx}-l_{TO}$. For a negative TO case as shown in FIG. 1B, the starting point of the FFT window may be given by $l_{idx}+l_{TO}$.

In a negative TO case, inter-symbol interference (ISI) may occur because the FFT window may occupy a portion of the next OFDM symbol (in the example illustrated in FIG. 1B, the CP portion of the next OFDM symbol).

In a positive TO case, the presence of the CP may prevent ISI depending on the magnitude of the TO. The term $l_{CP}$ may represent the CP length, and $l_{DS}$ may represent the delay spread (DS) of the channel. When $l_{idx}-l_{TO}>l_{idx}-l_{CP}+l_{DS}$ (that is, $l_{CP}>l_{TO}+l_{DS}$), there may be essentially no ISI.

In some embodiments, the sampling location may be set to a few samples before the estimated sampling location to prevent a negative TO situation. However, if the TO is too large, or the delay spread of the channel is too large such that $lC_P<l_{TO}+l_{DS}$, the FFT window may occupy a portion of a previous OFDM symbol and ISI may occur. Regardless of the source, ISI may degrade the performance of the system.

Effects of Timing Offset

To illustrate the effects of a time offset, the received signal at time samples n may be represented as $y_n$, n=0, . . . , N−1. After an FFT, the received signal at subcarrier k may be represented as $Y_k$, k=0, . . . , N−1. The transmitted reference signal symbol and frequency domain channel at subcarrier k may be represented as $X_k$ and $H_k$, respectively. Thus, the received signal may be given by $$Y_k = H_k X_k + W_k \qquad (1)$$

where $W_k$ may represent the noise at subcarrier k. The time offset may be represented as $l_{TO}$ samples, $l_{CP}$ may represent the cyclic prefix (CP) length, and $l_{DS}$ may represent the channel delay spread length. If there is essentially no ISI from a previous or next OFDM symbol (that is, $0<l_{TO}<l_{CP}-l_{DS}$), then the received signal at the k-th subcarrier with time offset $l_{TO}$ may be given by $$Y'_k = \sum_{n=0}^{N-1} y_{n-l_{TO}} e^{\frac{j2\pi kn}{N}} = e^{-\frac{j2\pi k l_{TO}}{N}} Y_k, \qquad (2)$$

and therefore, the channel estimate at the k-th subcarrier may be given by $$\hat{H}'_k = Y'_k \cdot X^*_k = e^{-\frac{j2\pi k l_{TO}}{N}} H_k + e^{-\frac{j2\pi k l_{TO}}{N}} W_k X^*_k \qquad (3)$$

which may be a phase rotated version of the original channel plus some noise. Thus, information about a time offset $l_{TO}$ may be embedded in the channel estimates $\hat{H}'_k$.

Symbol Timing Recovery Based on Power Delay Profile

Because channel estimates may contain information about a time offset, some STR techniques in accordance with example embodiments of the disclosure may extract timing information from one or more channel estimates (that may include reference signal information) to adjust the timing of an FFT window. For example, in some embodiments, an STR technique may be based on a periodic wideband reference signal such as a synchronization signal block (SSB) or tracking reference signal (TRS) in a 5G wireless network. The power delay profile (PDP) may be calculated from one or more channel estimates based on the wideband reference signal. The PDP information may be used to estimate a first arrival path (FAP) which may then be used to adjust the timing of the FFT window.

In some embodiments, a wideband reference signal such as SSB or TRS may be transmitted relatively infrequently. Thus, if the time offset for the FFT window drifts too much between the reference signal transmissions, for example, due to a large sampling clock error, then a PDP based STR algorithm may not adjust the timing of the FFT window with acceptable accuracy.

Symbol Timing Recovery Based on Center of Mass

Some STR techniques in accordance with example embodiments of the disclosure may track timing drift based on a more frequently transmitted reference signal such as a PDSCH DMRS signal in a 5G wireless system. For example, some embodiments may estimate a center of mass (COM) based on a frequency domain correlation between channels. However, in some embodiments, a single COM estimate may not be used to adjust a timing window directly. Instead, a previous COM estimate may be saved, and the difference between two consecutive COM estimates may be used to determine the time offset. Also, in some embodiments, COM estimation techniques may not be able to accommodate residual time offsets. Additionally, because a COM estimate may be based on a single FD channel correlation, COM estimates may be unstable. Moreover, because a COM-based time offset estimate may only indicate a change in the time offset, it may need an additional STR technique such as a PDP based STR technique to provide a complete reference timing.

Learning-Based Symbol Timing Recovery

Some STR techniques in accordance with example embodiments of the disclosure may use machine learning to estimate a time offset for adjusting a transform window. Logic based on machine learning may act as a mapping function to map one or more input features having reference signal timing information to one or more time offsets. The logic may be trained, for example, based on data collected over a wide range of channel types, signal-to-noise ratios (SNRs), and/or the like.

In some embodiments, learning-based STR may be characterized as a data-driven technique, whereas the PDP and/or COM-based STR techniques described above may be characterized as model-driven.

Figure 2:
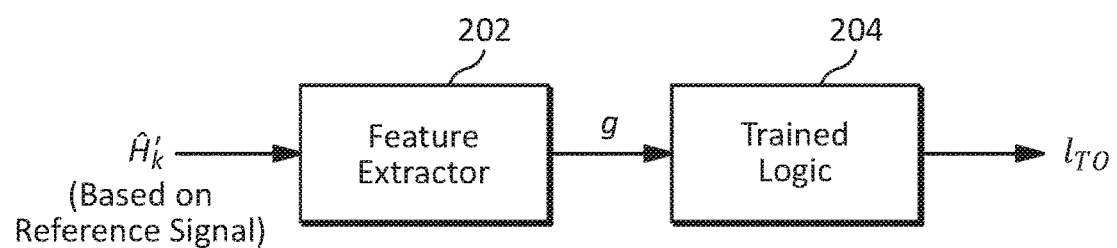
FIG. 2 illustrates an embodiment of a system for estimating a time offset in accordance with the disclosure.

FIG. 2 illustrates an embodiment of a system for estimating a time offset in accordance with the disclosure. The embodiment illustrated in FIG. 2 may include a feature extractor 202 and logic 204 based on machine learning. In some embodiments, the logic 204 based on machine learning may be referred to as trained logic. The feature extractor 202 may receive one or more channel estimates $\hat{H}'_k$ (e.g., frequency domain channel estimates) that may be estimated based on a reference signal. Examples of reference signals may include SSB, TRS, PDSCH DMRS, and/or the like. In some embodiments, the use of a reference signal that may be transmitted relatively frequently such as PDSCH DMRS may enable the system to track fast timing changes in a transform window.

The feature extractor 202 may extract one or more features g from the one or more channel estimates $\hat{H}_k'$. Examples of features may include frequency domain (FD) channel correlations, delay spread estimates (DSE), and/or the like. In some embodiments, depending on a subcarrier distance, the feature extractor 202 may calculate multiple FD channel correlations as candidate features.

The logic 204 may implement any type of machine learning to estimate one or more time offsets $l_{TO}$ based on one or more input features. For example, in some embodiments, supervised learning may be used to enable the logic 204 to learn a mapping function from one or more frequency domain channel correlations (input features) to one or more time offsets (output labels). In some embodiments, other types of machine learning such as unsupervised learning and/or reinforced learning (e.g., learning from experience) may be used to train the logic 204.

In some embodiments, the logic 204 may be trained offline (e.g., prior to operation), online (e.g., during real-time operation), or in a hybrid combination with initial offline training that may be refined or augmented based on online training. In some embodiments, the logic 204 may be implemented with one or more neural networks of any type such as a convolutional neural network (CNN), deep neural network (DNN), perceptron, multi-layer perceptron (MLP) (e.g., a feed-forward MLP), and/or the like.

Frequency Domain Channel Correlation

In some embodiments, frequency domain (FD) channel correlations may be used as input features for a learning-based STR because time offsets may cause a linear phase rotation at different subcarriers. Thus, a time offset may be determined using FD channel correlations between channel estimates from a reference signal.

Figure 3:
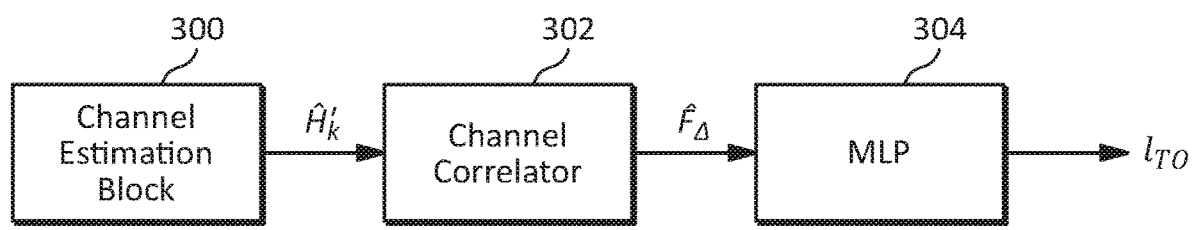
FIG. 3 illustrates an example embodiment of a system for estimating a time offset using channel correlations in accordance with the disclosure.

FIG. 3 illustrates an example embodiment of a system for estimating a time offset using channel correlations in accordance with the disclosure. The system illustrated in FIG. 3 may illustrate some example implementation details that may be used, for example, to implement the system illustrated in FIG. 2.

The system illustrated in FIG. 3 may include a channel estimation block 300, a channel correlator 302, and a neural network which, in this example, may be implemented as an MLP 304. The channel estimation block 300 may provide any number of channel estimates $\hat{H}_k'$, where k may indicate a number of subcarriers, for example, k=0, . . . , N−1. The channel correlator 302, which may operate as a feature extractor, may generate any number of channel correlations $\hat{F}_\Delta$ based on the channel estimates $\hat{H}_k'$. The channel correlations $\hat{F}_\Delta$ may be applied as input features to the MLP 304 which may generate an estimated time offset $l_{TO}$ based on a mapping learned, for example, during a training process.

In some embodiments, one or more different precoding matrices may be applied to a PDSCH DMRS in different bundles. Thus, in some embodiments, frequency domain channel correlations may be calculated on a per-bundle basis.

In some embodiments, $\hat{F}_{\Delta,m}$, may refer to a frequency domain (FD) channel correlation between channels separated by $\Delta$ subcarriers, which may be estimated, for example, based on PDSCH DMRS channels in the m-th bundle. Thus, $\hat{F}_{\Delta,m}$ may be calculated as $$\hat{F}_{\Delta,m} = \frac{1}{|K_\Delta|} \sum_{k \in K_\Delta} \hat{H}_{m,k}'^* \cdot \hat{H}_{m,k+\Delta}' \quad (4)$$

Where $\hat{H}_{m,k}'$ may refer to the frequency domain channel estimate at the k-th subcarrier in the m-th bundle, and $K_\Delta$ may refer to a set which includes subcarrier indexes that may satisfy two conditions: (1) the subcarrier index corresponds to a PDSCH DMRS location, and (2) both subcarrier index k and subcarrier index k+$\Delta$ belong to the same bundle.

In one example embodiment, resources may be allocated for a DMRS configuration type 1, the DMRS may start from 0-th subcarrier, and the bundle size may be configured to 2. In this example, a set of possible subcarrier indexes corresponding to the PDSCH DMRS locations in a bundle may be {0, 2, 4, 6, 8, 10, 12, 14, 16, 18, 20, 22}. In some embodiments, it may be convenient to drop the final entry. Thus, for purposes of illustration, in this example embodiment, the set of possible subcarrier indexes corresponding to the PDSCH DMRS locations in a bundle may be {0, 2, 4, 6, 8, 10, 12, 14, 16, 18, 20}. Continuing this example, for $K_\Delta$ with $\Delta$=2, since the subcarrier index k and subcarrier index k+$\Delta$ both belong to the same bundle, $K_2$={0, 2, 4, 6, 8, 10, 12, 14, 16, 18}. Similarly, for $K_\Delta$ with $\Delta$=20, $K_{20}$={0}. In other embodiments, however, different values may be used for the DMRS configuration type, values of $\Delta$, and/or any other parameters.

After $\hat{F}_{\Delta,m}$ is calculated for the m-th bundle, the final frequency domain channel correlation $\hat{F}_\Delta$ may be given by $$\hat{F}_\Delta = \frac{1}{M} \sum_{m=1}^{M} \hat{F}_{\Delta,m} \quad (5)$$

where M may represent the total number of configured bundles. One or more final frequency domain channel correlations $\hat{F}_\Delta$ may then be used as input features to the neural network which, in this example, may be implemented as an MLP 304.

Feature Selection—Subset of Channel Correlations

In some embodiments, the total number of candidate channel correlations $\hat{F}_\Delta$ may depend on the DMRS type and/or the bundle size. In one example in which DMRS is configured as type 1, and the bundle size is configured as 2, the candidate set of $\Delta$ may be {2, 4, 6, 8, 10, 12, 14, 16, 18, 20}, such that the total number of possible $\Delta$ values may be 10. Since $\hat{F}_\Delta$ may be a complex number, the real and imaginary part of $\hat{F}_\Delta$ may be separately treated as inputs to the neural network. As a result, there may be a total of 20 candidate features such that real{$\hat{F}_\Delta$}, imag{$\hat{F}_\Delta$}, $\Delta$=2, 4, 6, 8, 10, 12, 14, 16, 18, 20.

However, in some embodiments, some of the candidate features may be omitted while still providing acceptable performance. By using only a subset of the set of possible (e.g., available) input features, the number of inputs to the neural network may be reduced. Depending on the implementation details, this may reduce the size, cost, complexity, computational load, power consumption, storage space, and/or the like of the neural network.

FIGS. 4A through 4E illustrate some examples of subsets of channel correlations $\hat{F}_\Delta$, that may be used as inputs to a neural network in accordance with example embodiments of the disclosure. In the embodiments illustrated in FIGS. 4A through 4E, shaded blocks indicate values of Δ for which channel correlations $\hat{F}_\Delta$ may be calculated and applied as inputs to a neural network, whereas unshaded blocks indicate values of Δ for which channel correlations $\hat{F}_\Delta$ may be omitted.

Figure 4A:
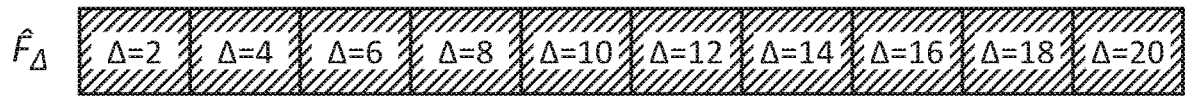
FIGS. 4A through 4E illustrate examples of subsets of channel correlations that may be used as inputs to a neural network in accordance with example embodiments of the disclosure.
Figure 4B:
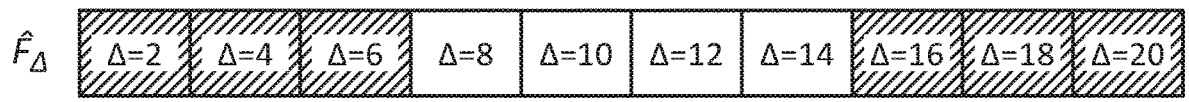
Figure 4C:
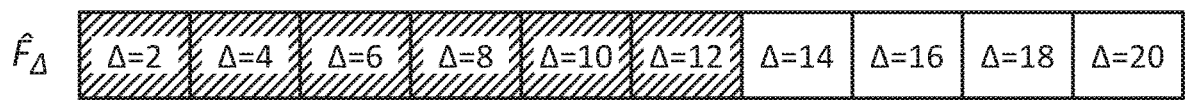
Figure 4D:
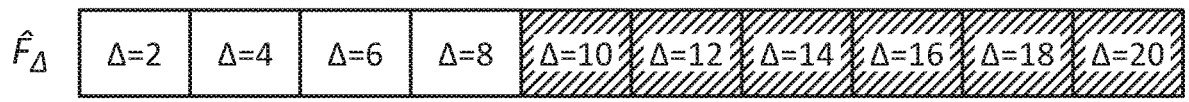
Figure 4E:
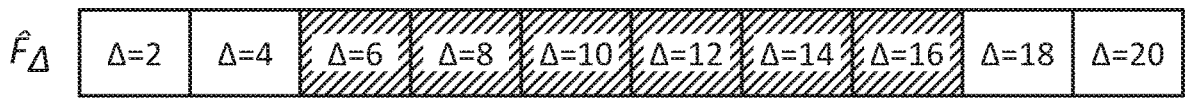

FIG. 4A illustrates an embodiment in which all available channel correlations $\hat{F}_\Delta$ may be calculated and applied as inputs to a neural network. FIG. 4B illustrates an embodiment in which only some of the outermost channel correlations $\hat{F}_\Delta$ (e.g., two end portions for which Δ=2, 4, 6, 16, 18, 20) may be calculated and applied as inputs to a neural network. FIG. 4C illustrates an embodiment in which only some of the left channel correlations $\hat{F}_\Delta$ (e.g., left portions for which Δ=2, 4, 6, 8, 10, 12) may be calculated and applied as inputs to a neural network. FIG. 4D illustrates an embodiment in which only some of the right channel correlations $\hat{F}_\Delta$ (e.g., right portions for which Δ=10, 12, 14, 16, 18, 20) may be calculated and applied as inputs to a neural network. FIG. 4E illustrates an embodiment in which only some of the innermost channel correlations $\hat{F}_\Delta$ (e.g., middle portion for which Δ=6, 8, 10, 12, 14, 16) may be calculated and applied as inputs to a neural network.

In some embodiments, utilizing features that include only two end portions of a set of FD channel correlations may provide performance that may be close to that provided by the full set of correlations while reducing the number of input features to the neural network. For example, the number of input features may be reduced from 20 features (e.g., real$\{\hat{F}_\Delta\}$, imag$\{\hat{F}_\Delta\}$, Δ=2, 4, 6, 8, 10, 12, 14, 16, 18, 20, to 12 features (e.g., real$\{\hat{F}_\Delta\}$, imag$\{\hat{F}_\Delta\}$, Δ=2, 4, 6, 16, 18, 20) while still providing adequate performance. Thus, some embodiments discussed below may be described in the context of an implementation in which only the outermost FD channel correlations (e.g., end portions) may be used, but in other embodiments, the full set of available channel correlations, or any subset thereof, may be used. Likewise, any other types of features such as DSE may be used.

Feature Selection—Input Features for Different DMRS Types

In some example embodiments configured for DMRS type 1, the following 12 features: real$\{\hat{F}_\Delta\}$, imag$\{\hat{F}_\Delta\}$, Δ=2, 4, 6, 16, 18, 20 may be applied as inputs to a neural network regardless of whether the bundle size is configured to 2 or 4.

In some example embodiments configured for DMRS type 2, the DMRS may start from 0-th subcarrier, and the bundle size may be configured to 2. In this configuration, a set of all possible subcarrier indexes that may correspond to the PDSCH DMRS locations in a bundle may be {0, 1, 6, 7, 12, 13, 18, 19}. In some embodiments, it may be convenient to drop some of the subcarrier indexes and use {0, 6, 12, 18} as the set of all possible subcarrier indexes. Thus, the candidate Δ for DMRS type 2 may be {6, 12, 18}. The real and imaginary parts of $\hat{F}_\Delta$ may be treated separately. However, in this example, since there may only be a total of three candidate Δ, it may not be beneficial or feasible to use only a subset of the set of possible input features, and all of the candidate Δ may be included as input features for DMRS type 2. Thus, in some example embodiments, the input features for a neural network with DMRS type 2 may be real$\{\hat{F}_\Delta\}$, imag$\{\hat{F}_\Delta\}$, Δ=6, 12, 18. This set of six features may be applied as inputs to a neural network regardless of whether the bundle size is configured to 2 or 4.

Table 1 illustrates some example input features for a neural network for different DMRS types based on the example embodiments described above. These details are only provided for purposes of illustrating the principles of this disclosure, and any other values may be used.

TABLE 1

| DMRS Type | Input Features |
|---|---|
| Type 1 | real$\{\hat{F}_\Delta\}$, imag$\{\hat{F}_\Delta\}$, Δ = 2, 4, 6, 16, 18, 20 |
| Type 2 | real$\{\hat{F}_\Delta\}$, imag$\{\hat{F}_\Delta\}$, Δ = 6, 12, 18 |

Multi-Layer Perceptron

Figure 5:
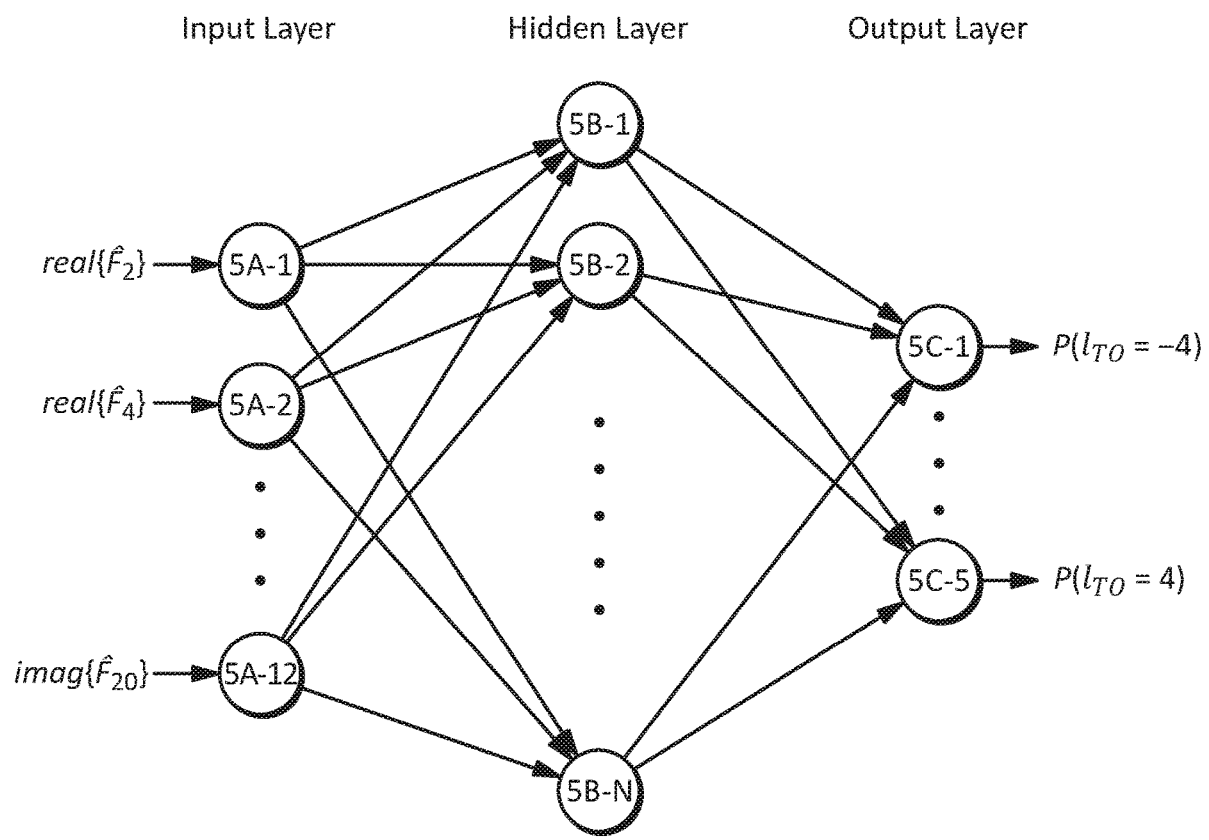
FIG. 5 illustrates an example embodiment of a multi-layer perceptron in accordance with the disclosure.

FIG. 5 illustrates an example embodiment of an MLP in accordance with the disclosure. The MLP illustrated in FIG. 5 may be used, for example, to implement the MLP 304 illustrated in FIG. 3 for DMRS configured as Type 1 as shown in Table 1. The MLP may include an input layer including input nodes 5A-1, 5A-2, . . . , 5A-12, each of which may receive a respective one of the input FD channel correlations real$\{\hat{F}_\Delta\}$, imag$\{\hat{F}_\Delta\}$, Δ=2, 4, 6, 16, 18, 20.

The MLP may also include an output layer including output nodes 5C-1, 5C-2, . . . , 5C-5, each of which may provide an output label corresponding to a probability of the time offset being a certain value. In the example illustrated in FIG. 5, each output label may correspond to a probability P of the time offset $l_{TO}$ being x such that $P(l_{TO}=x)$ where $x \in \{-4, -2, 0, 2, 4\}$.

The MLP may further include a hidden layer including hidden nodes 5B-1, 5B-2, . . . , 5B-N, each of which may receive one or more inputs from one or more of the input nodes 5A-1, 5A-2, . . . , 5A-12 and provide an output to one or more of the output nodes 5C-1, 5C-2, . . . , 5C-5. In various embodiments, a hidden layer may include any number of nodes, e.g., 64 nodes.

Figure 6:
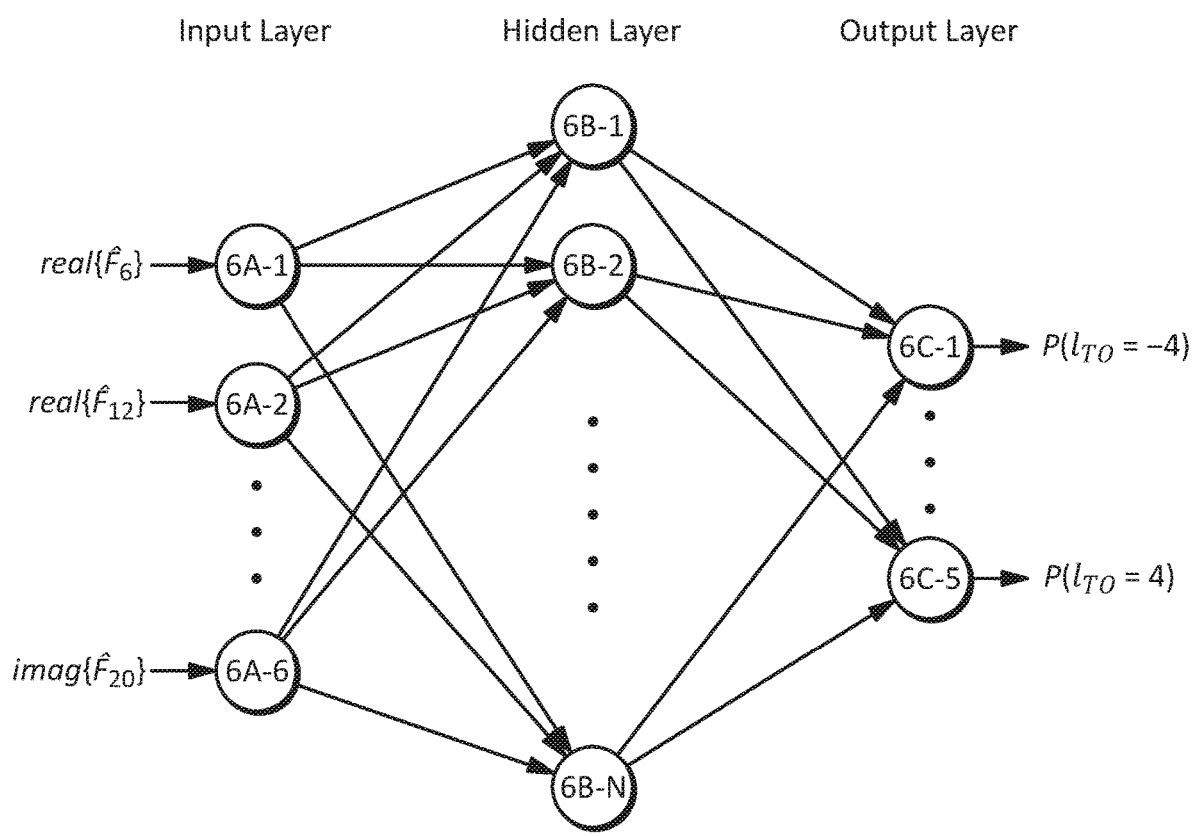
FIG. 6 illustrates another example embodiment of a multi-layer perceptron in accordance with the disclosure.

FIG. 6 illustrates another example embodiment of an MLP in accordance with the disclosure. The embodiment illustrated in FIG. 6 may be used, for example, to implement the MLP 304 illustrated in FIG. 3 for DMRS configured as Type 2 as shown in Table 1. The MLP may include an input layer including input nodes 6A-1, 6A-2, . . . , 6A-6, each of which may receive a respective one of the input FD channel correlations real$\{\hat{F}_\Delta\}$, imag$\{\hat{F}_\Delta\}$, Δ=6, 12, 20.

The MLP may also include an output layer including output nodes 6C-1, 6C-2, . . . , 6C-5, each of which may provide an output label corresponding to a probability of the time offset being a certain value. In the example illustrated in FIG. 6, each output label may correspond to a probability P of the time offset $l_{TO}$ being x such that $P(l_{TO}=x)$ where $x \in \{-4, -2, 0, 2, 4\}$.

The MLP may further include a hidden layer including hidden nodes 6B-1, 6B-2, . . . , 6B-N, each of which may receive one or more inputs from one or more of the input nodes 6A-1, 6A-2, . . . , 6A-6 and provide an output to one or more of the output nodes 6C-1, 6C-2, . . . , 6C-5.

For purposes of illustrating the principles of the disclosure, some embodiments have been described with example implementation details, but the principles may be realized with any other implementation details. For example, any type of neural network or other logic based on machine learning such as CNN, DNN, and/or the like may be used as mentioned above. In embodiments implemented with an MLP or other neural network, any number of layers including hidden layers may be used, and any number of nodes may be used in any layer. Outputs of the logic based on machine learning may be implemented as continuous outputs (e.g., for regression), discrete outputs, or hybrid combinations thereof. In some embodiments in which timing may be implemented in units of samples, an implementation with discrete outputs may be beneficial because one or more values may already be in discrete form.

As another example, any sets and/or subsets of input features may be applied to a neural network. For example, some embodiments may have been described as using 12 FD channel correlations corresponding to Δ=2, 4, 6, 16, 18, 20 (for DMRS type 1), however, other subsets such as Δ=2, 4, 6, 8, 14, 16, 18, 20 or Δ=2, 4, 18, 20 may be used, as well as other subsets of all, middle, ends, right side, left side, and/or the like.

Time Offset Estimation

In some embodiments, a learning-based STR algorithm in accordance with the disclosure may be formulated as a classification problem. For example, in the embodiments illustrated in FIG. 5 and FIG. 6, a neural network (e.g., MLP) may have an output layer with 5 nodes corresponding to time offsets of −4, −2, 0, 2, or 4, and thus, providing a total of 5 classes. (In some embodiments, these time offsets may be implemented in terms of sample clock cycles.) In embodiments implemented as a classification problem, a cross-entropy cost function may be used and a soft-max function may be applied after the nodes in the output layer. As a result, the output of the MLP may correspond to the probability that the input feature belongs to each class, e.g., the probability that the time offset equals −4, −2, 0, 2, or 4.

In some embodiments, the final estimated time offset may be obtained using a mean combining technique in which the final time offset may be estimated by averaging one or more of the output time offsets with a weight that may equal the output of the MLP network as follows $$\hat{l}_{TO} = \sum_{x \in \{-4,-2,0,2,4\}} P(l_{TO} = x) \cdot x \quad (6)$$

where P may represent a probability of the time offset $l_{TO}$ being a certain value x.

In some embodiments, the final estimated time offset may be obtained using a maximum combining technique in which the final time offset may be estimated as the time offset label that corresponds to the largest output of the MLP network as follows $$\hat{l}_{TO} = \underset{x \in \{-4,-2,0,2,4\}}{\operatorname{argmax}} P(l_{TO} = x). \quad (7)$$

Although some example embodiments may have been illustrated as having five output labels corresponding to time offsets of −4, −2, 0, 2, 4 samples, any number of labels having any values of time offsets covering smaller or larger ranges may be used. For example, some embodiments may implement three output labels corresponding to time offsets −2, 0, 2, five output labels corresponding to time offsets −8, −4, 0, 4, 8, and/or the like.

Combined Estimates

In some embodiments, an estimated time offset generated by logic based on machine learning may be used to directly adjust the timing window of an FFT or other transform. However, in some embodiments, it may be beneficial to combine timing estimates from multiple sources. For example, depending on a range of time offsets that may be used for a specific implementation, a neural network may use a relatively large number of labels to cover the range with adequate resolution (e.g., 17 output labels corresponding to time offsets −16, −14, −12, −10, −8, −6, −4, −2, 0, 2, 4, 6, 8, 10, 12, 14, 16). This, in turn, may involve the use of a relatively large amount of resources for the neural network such as memory, processing resources, training resources, and/or the like.

In some embodiments, an estimated time offset generated by trained logic may be combined with another timing estimate, for example, an estimated FAP based on a PDP from one or more channel estimates. Depending on the implementation details, this type of combination may enable an STR system to cover a wide range of time offsets while reducing the amount of resources used by the trained logic.

Figure 7:
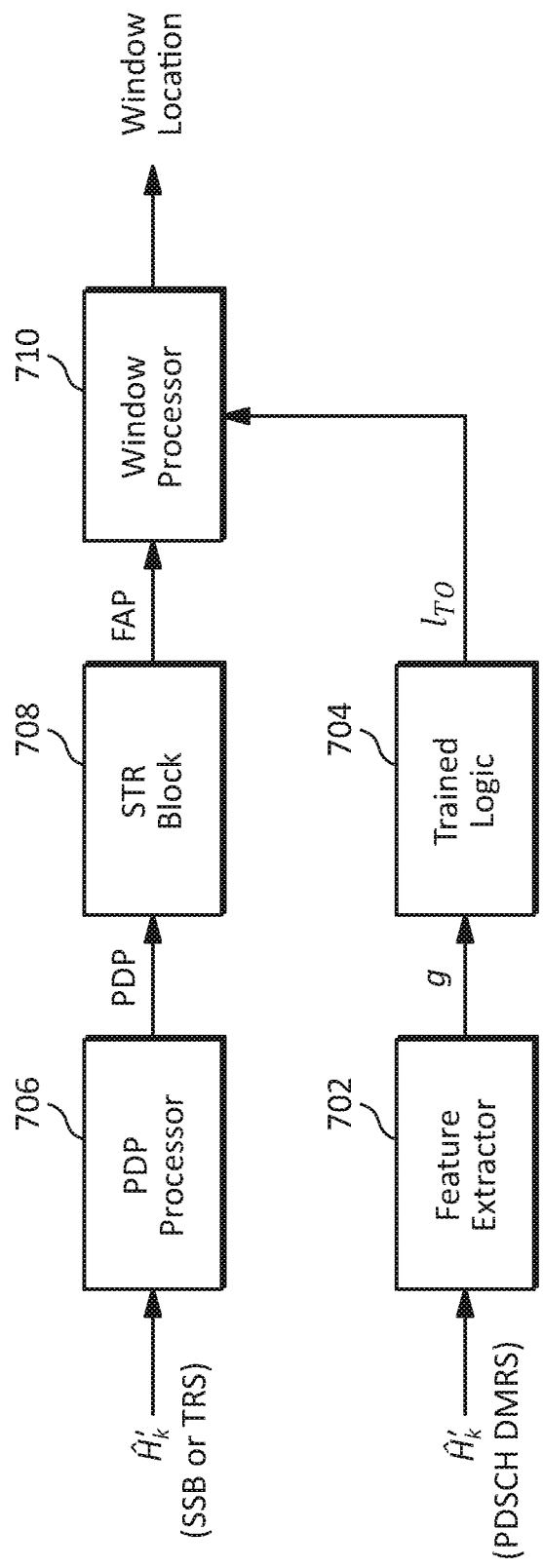
FIG. 7 illustrates an example embodiment of a system for adjusting the timing of a transform window in accordance with the disclosure.

FIG. 7 illustrates an example embodiment of a system for adjusting the timing of an FFT or other transform window in accordance with the disclosure. The embodiment illustrated in FIG. 7 may include a first processing path having a feature extractor 702 and trained logic 704, a second processing path including a PDP processor 706 and an STR block 708, and a window processor 710.

In some embodiments, the feature extractor 702 and trained logic 704 may operate in a manner similar to those in the embodiment illustrated in FIG. 2 to implement learning-based STR. The feature extractor may receive one or more FD channel estimates $\hat{H}_k'$ based on a reference signal that may be transmitted relatively frequently such as PDSCH DMRS. The feature extractor 702 may generate one or more input features g that may be applied to the trained logic 704 which may generate an estimated time offset $l_{TO}$.

The PDP processor 706 may generate PDP information from one or more FD channel estimates $\hat{H}_k'$ based on a reference signal that may be transmitted relatively infrequently, for example, a periodic wideband reference signal such as SSB or TRS. The STIR block 708 may use the PDP information to estimate an FAP.

The window processor 710 may combine the estimated FAP and estimated time offset $l_{TO}$ to adjust the timing window of an FFT or other transform.

In the embodiment illustrated in FIG. 7, the trained logic 704 may be implemented with relatively small neural network (e.g., MLP) that may be trained to provide a relatively small number of output labels (e.g., five labels that may represent time offsets $l_{TO}$=−4, −2, 0, 2, 4), so the maximal time offset the learning-based STR can compensate may be +/−4. However, these relatively small number of output labels may be combined in a synergistic manner with the underlying PDP based STR algorithm to provide complete reference timing over a wider range of time offsets. Moreover, because the feature extractor 702 and trained logic 704 may operate based on a reference signal that may be transmitted relatively frequently such as PDSCH DMRS, they may track relatively fast timing changes that may occur between transmissions of the wideband reference signals such as SSB or TRS.

Figure 8:
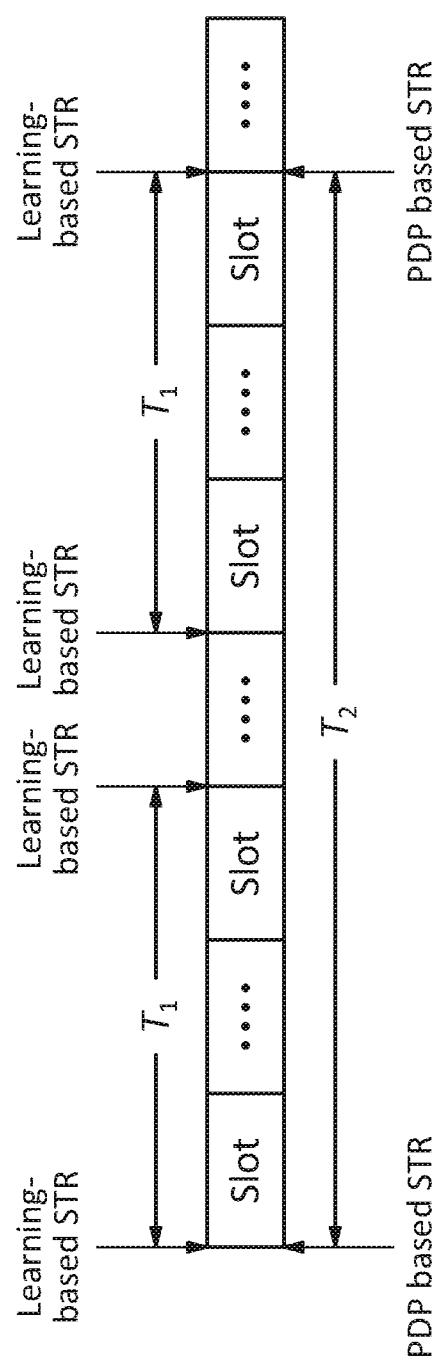
FIG. 8 is a timing diagram illustrating the operation of an embodiment of system combining timing estimates from multiple sources in accordance with the disclosure.

FIG. 8 is a timing diagram illustrating the operation of an embodiment of a system that may combine timing estimates from multiple sources in accordance with the disclosure. The timing diagram shown in FIG. 8 may illustrate, for example, some aspects of the operation of the system illustrated in FIG. 7.

FIG. 8 illustrates time periods for two different STR algorithms. For example, the PDP based STR implemented by the PDP processor 706 and STR block 708 may operate on time period $T_2$, while the learning-based STR implemented by the feature extractor 702 and trained logic 704 may operate on a time period $T_1$.

Time period $T_2$ for PDP based STR may depend on the configurations of the period of the underlying reference signal. For example, for an SSB reference signal with a period 10 ms, the PDP based STR may have a period $T_2$=10 ms, which may correspond to 80 slots for subcarrier spacing (SCS) set to 120 KHz. However, if the time offset drifts during the period between transmissions of the wideband reference signal, e.g., due to large sampling clock error, PDP based STR algorithm may be unable to track the fast time offset drift completely because the next reference signal has not been transmitted yet.

To track the fast timing drift, the learning-based STR may utilize channel estimates from a PDSCH DMRS reference signal which may be transmitted more frequently (e.g., having a shorter period $T_1$). In some embodiments, PDSCH DMRS can be transmitted in every slot in which PDSCH data is transmitted. In some embodiments, the period $T_1$ of the learning-based STR may be implemented as a configurable parameter that may be set based on the anticipated speed of timing drift the system may be configured to track. For example, if the fastest timing drift the system may be configured to track is 1 sample/ms, the period $T_1$ of the learning-based STR may be set to $T_1$=1 ms, which may correspond to 8 slots if SCS is set to 120 KHz.

Iterative Pruning

In some embodiments, iterative pruning may be used to reduce the number of parameters in trained logic, e.g., the number of weights in a neural network. Depending on the implementation details, this may reduce the cost, complexity, processing time, storage space, IC area, power consumption, and/or the like of the neural network and/or associated apparatus.

In an example embodiment of an iterative pruning process in accordance with the disclosure, at each iteration, training may be conducted with a mask applied to the weights and/or gradients of the neural network, which may force some elements of the weights to zero if those elements are smaller than the multiplication of a predefined threshold and the standard deviation of some or all of the weights. The mask set may be enlarged after one or more iterations, and the output weights in the last iteration may be used as the final output weights for the trained neural network.

User Equipment

Figure 9:
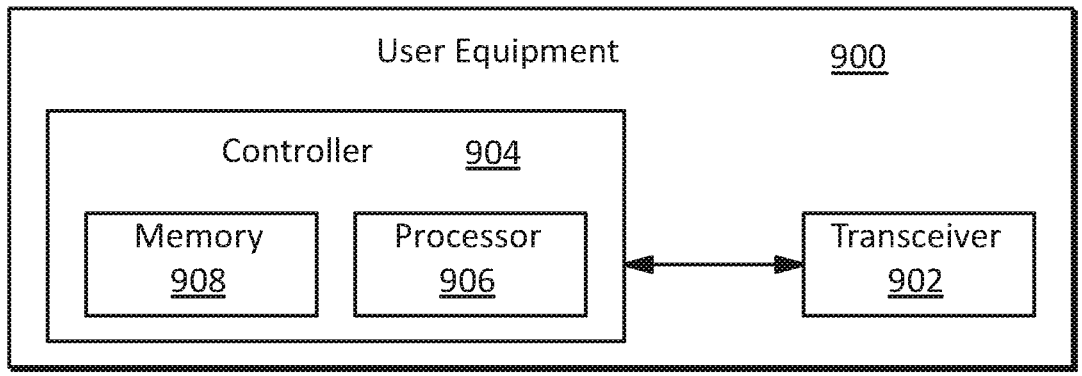
FIG. 9 illustrates an example embodiment of a user equipment in accordance with the disclosure.

FIG. 9 illustrates an example embodiment of a user equipment (UE) in accordance with the disclosure. The embodiment 900 illustrated in FIG. 9 may include a radio transceiver 902 and a controller 904 which may control the operation of the transceiver 902 and/or any other components in the UE 900. The UE 900 may be used, for example, to implement any of the functionality described in this disclosure including learning-based STR, PDP based STR, feature extraction, FD channel correlation, neural network training and/or inference, estimation of time offsets, combining of time estimates and/or offsets and/or the like.

The transceiver 902 may transmit/receive one or more signals to/from a base station, and may include an interface unit for such transmissions/receptions. For example, the transceiver 902 may receive PDSCH signals and/or reference signals such as SSB, TRS, PDSCH DMRS and/or the like from a base station.

The controller 904 may include, for example, one or more processors 906 and a memory 908 which may store instructions for the one or more processors 906 to execute code to implement any of the functionality described in this disclosure. For example, the controller 904 may be used to implement learning-based STR, PDP based STR, feature extraction, FD channel correlation, neural network training and/or inference, estimation of time offsets, combining of time estimates and/or offsets and/or the like.

Base Station

Figure 10:
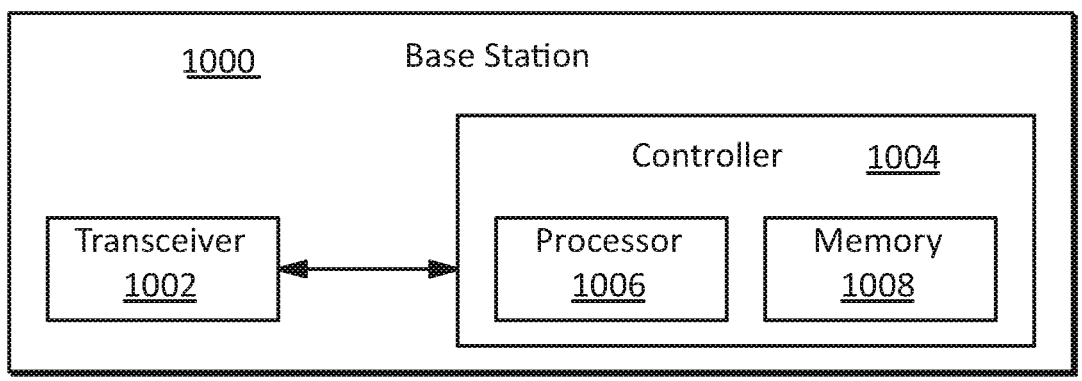
FIG. 10 illustrates an example embodiment of a base station in accordance with the disclosure.

FIG. 10 illustrates an example embodiment of a base station in accordance with the disclosure. The embodiment 1000 illustrated in FIG. 10 may include a radio transceiver 1002 and a controller 1004 which may control the operation of the transceiver 1002 and/or any other components in the base station 1000. The base station 1000 may be used, for example, to implement any of the functionality described in this disclosure including learning-based STR, PDP based STR, feature extraction, FD channel correlation, neural network training and/or inference, estimation of time offsets, combining of time estimates and/or offsets and/or the like.

The transceiver 1002 may transmit/receive one or more signals to/from a user equipment, and may include an interface unit for such transmissions/receptions. For example, the transceiver 1002 may transmit PDSCH signals and/or reference signals such as SSB, TRS, PDSCH DMRS and/or the like to a UE.

The controller 1004 may include, for example, one or more processors 1006 and a memory 1008 which may store instructions for the one or more processors 1006 to execute code to implement any of the base station functionality described in this disclosure. For example, the controller 1004 may be used to implement learning-based STR, PDP based STR, feature extraction, FD channel correlation, neural network training and/or inference, estimation of time offsets, combining of time estimates and/or offsets and/or the like.

In the embodiments illustrated in FIGS. 9 and 10, the transceivers 902 and 1002 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 904 and 1004 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such a complex instruction set computer (CISC) processors such as x86 processors and/or reduced instruction set computer (RISC) processors such as ARM processors, and/or the like, executing instructions stored in any type of memory, graphics processing units (GPUs), neural processing units (NPUs), tensor processing units (TPUs), and/or the like.

Additional Embodiments

Figure 11:
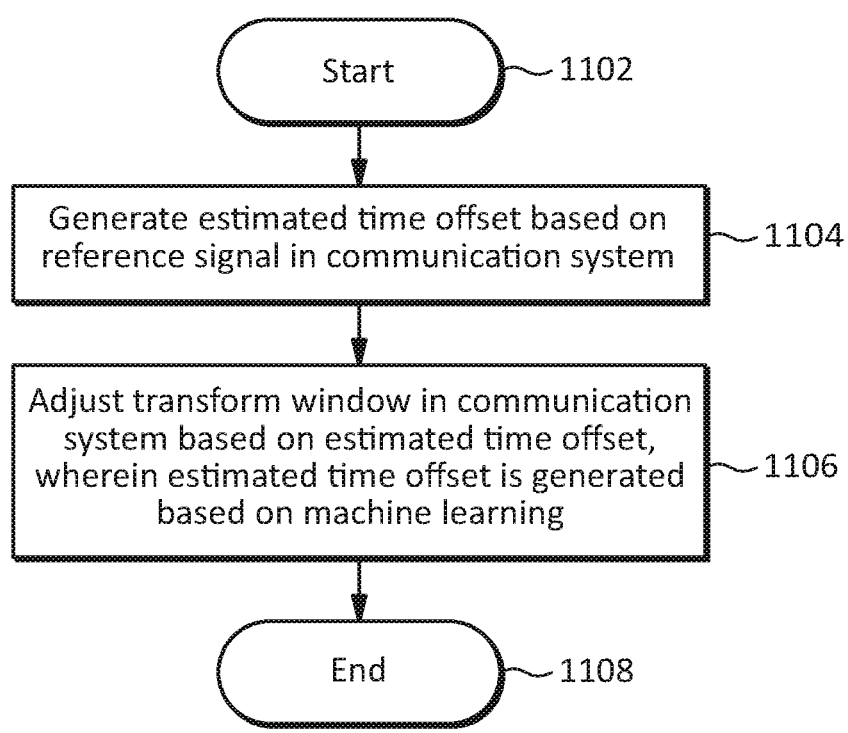
FIG. 11 illustrates an embodiment of a method for adjusting the timing of a transform window in accordance with the disclosure.

FIG. 11 illustrates an embodiment of a method for adjusting the timing of a transform window in accordance with the disclosure. The method may begin at operation 1102. At operation 1104, the method may generate an estimated time offset based on a reference signal in a communication system. At operation 1106, the method may adjust a transform window in the communication system based on the estimated time offset, wherein the estimated time offset may be generated based on machine learning. The method may end at operation 1108.

In the embodiment illustrated in FIG. 11, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A method comprising:
generating a first estimated time offset based on a first reference signal periodically recurring with a first period in a communication system, wherein the first estimated time offset is generated based on machine learning;
generating a second estimated time offset based on a second reference signal in the communication system periodically recurring with a second period that is longer than the first period; and
adjusting a transform window in the communication system based on a combination of the first estimated time offset and the second estimated time offset.

2. The method of claim 1, wherein generating the first estimated time offset comprises applying the machine learning to one or more channel estimates derived from the first reference signal.

3. The method of claim 1, wherein generating the first estimated time offset comprises:
extracting one or more features from one or more channel estimates derived from the first reference signal; and
generating the first estimated time offset based on the one or more features.

4. The method of claim 3, wherein extracting the one or more features comprises determining a correlation between a first channel and a second channel.

5. The method of claim 4, wherein the correlation comprises a frequency domain correlation between the first channel and the second channel.

6. The method of claim 4, wherein extracting the one or more features comprises extracting a subset of a set of features of the one or more channel estimates.

7. The method of claim 6, wherein the set of features comprises a set of frequency domain channel correlations.

8. The method of claim 7, wherein:
the set of frequency domain channel correlations are calculated on a per-bundle basis based on frequency domain channels separated by bundle-specific subcarriers, wherein each bundle includes a pre-determined number of bundle-specific subcarriers;
the set of frequency domain channel correlations are based on channel correlations corresponding to a series of bundles of different numbers of bundle-specific subcarriers; and
the subset comprises frequency domain channel correlations based on one or more highest number of bundle-specific subcarriers and one or more lowest number of bundle-specific subcarriers.

9. The method of claim 3, wherein a neural network generates the first estimated time offset based on the one or more features.

10. The method of claim 3, wherein generating the first estimated time offset based on the one or more features is performed, at least in part, by a neural network.

11. The method of claim 10, wherein the neural network generates one or more classification outputs based on the one or more features.

12. The method of claim 11, wherein generating the first estimated time offset comprises combining two or more classification outputs from the neural network.

13. A method comprising:
estimating a time offset in a communication system based on a first reference signal periodically recurring with a first period, wherein the time offset is estimated using a machine learning process;
estimating a first arrival path based on a second reference signal in the communication system that is transmitted periodically with a second period longer than the first period; and
adjusting a transform window in the communication system based on a combination of the time offset and the first arrival path.

14. The method of claim 13, wherein estimating the time offset based on the first reference signal comprises:
generating one or more channel estimates based on the first reference signal;

extracting one or more features from the one or more channel estimates; and generating, by the machine learning process, the time offset based on the one or more features.

15. The method of claim 14, wherein:

the one or more channel estimates provide a set of frequency domain channel correlations between channels separated by a pre-determined number of subcarriers; and extracting the one or more features comprises extracting a subset of the set of frequency domain channel correlations.

16. The method of claim 15, wherein a number of candidate frequency domain channel correlations is based on a signal configuration of the first reference signal and a resource block bundling configuration.

17. The method of claim 14, wherein the machine learning process is based on a neural network.

18. An apparatus comprising:

a feature extractor configured to extract one or more features from one or more channel estimates based on a first reference signal periodically recurring with a first period;

trained logic configured to generate a first estimated time offset based on the one or more features;

a timing recovery block configured to generate a second estimated time offset based on a second reference signal periodically recurring with a second period that is longer than the first period; and a window processor configured to adjust a transform window based on a combination of the first estimated time offset and the second estimated time offset.

19. The apparatus of claim 18, wherein:

the feature extractor comprises a channel correlator; and the trained logic comprises a neural network.

* * * * *